(12) United States Patent
Sakurai et al.

(10) Patent No.: US 12,589,695 B2
(45) Date of Patent: Mar. 31, 2026

(54) BOARDING AND ALIGHTING STEP-MOUNTED VEHICLE

(71) Applicant: TOYOTA JIDOSHA KABUSHIKI KAISHA, Toyota (JP)

(72) Inventors: Hideyuki Sakurai, Toyota (JP); Katsuya Shimazu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 18/364,799

(22) Filed: Aug. 3, 2023

(65) Prior Publication Data

US 2024/0109493 A1 Apr. 4, 2024

(30) Foreign Application Priority Data

Oct. 4, 2022 (JP) ................................. 2022-160387

(51) Int. Cl.
| | |
|---|---|
| *B60R 3/02* | (2006.01) |
| *B60J 5/04* | (2006.01) |
| *B60J 5/06* | (2006.01) |
| *B60J 10/84* | (2016.01) |
| *B60J 10/86* | (2016.01) |

(52) U.S. Cl.
CPC ............... *B60R 3/02* (2013.01); *B60J 5/0479* (2013.01); *B60J 5/06* (2013.01); *B60J 10/84* (2016.02); *B60J 10/86* (2016.02); *B60J 2005/0475* (2013.01)

(58) Field of Classification Search
CPC .... B60R 3/02; B60J 10/84; B60J 10/86; B60J 5/0479; B60J 5/06; B60J 2005/0475
See application file for complete search history.

(56) References Cited

U.S. PATENT DOCUMENTS

| | | | |
|---|---|---|---|
| 8,235,432 B2 * | 8/2012 | Ryan ....................... | B60R 19/38 |
| | | | 293/118 |
| 11,878,655 B2 * | 1/2024 | Erasala ..................... | B60J 5/06 |

FOREIGN PATENT DOCUMENTS

| | | |
|---|---|---|
| JP | 2011-038264 A | 2/2011 |
| JP | 2022-061596 A | 4/2022 |

* cited by examiner

*Primary Examiner* — Bryan A Evans

(74) *Attorney, Agent, or Firm* — SoraIP, Inc.

(57) ABSTRACT

A boarding and alighting step-mounted vehicle includes an entrance provided in a vehicle side portion, a sliding door having two door portions for opening and closing the getting-on/off port by sliding in directions opposite to each other in the vehicle front-rear direction, and a step body having a step body for allowing an occupant to step when getting on and off the vehicle. The step is switchable between the use state and the closed state by rotating the vehicle lower portion on the entrance side as a pivot axis. In the use state of the step, the step body is in a posture deployed outward of the vehicle. In the closed state of the step, the step body is closed on the vehicle side and is in a posture facing the sliding door.

2 Claims, 6 Drawing Sheets

BOARDING AND ALIGHTING STEP-MOUNTED VEHICLE

CROSS-REFERENCE TO RELATED APPLICATION

This application claims priority to Japanese Patent Application No. 2022-160387 filed on Oct. 4, 2022, incorporated herein by reference in its entirety.

BACKGROUND

1. Technical Field

The present disclosure relates to a boarding and alighting step-mounted vehicle. In particular, the present disclosure relates to a vehicle in which a sliding door is provided on a side portion of a vehicle body, and a boarding and alighting step is deployed outward of the vehicle body on a lower side of the sliding door.

2. Description of Related Art

Conventionally, in an automobile, a structure is known in which a boarding and alighting step is provided in the vicinity of a lower portion of an entrance in order to make it easier for a person to get on and off the automobile.

Further, for example, in a vehicle such as a bus, a sliding door may be provided on a side portion of a vehicle body. As a configuration of the sliding door, there is known a configuration having two door portions that open and close the entrance by sliding in the direction opposite to each other in the vehicle front-rear direction (see, for example, Japanese Unexamined Patent Application Publication No. 2022-61596 (JP 2022-61596 A)).

SUMMARY

In many vehicles, a configuration in which a center pillar is disposed between a front door and a rear door is adopted. In this case, when a side collision of a vehicle with another vehicle occurs, the amount of entry of the other vehicle into the vehicle can be reduced by the center pillar.

On the other hand, in the sliding door having two door portions, since there is no pillar between the two door portions, when the other vehicle collides with the sliding door of the vehicle, there is a possibility that the amount of entry of the sliding door into the vehicle is relatively large.

An object of the present disclosure is that, when a side collision of a vehicle having a sliding door at a side portion with another vehicle occurs, the amount of entry of the sliding door into the vehicle is able to be reduced.

A boarding and alighting step-mounted vehicle according to the present disclosure includes: an entrance provided on a side portion of a vehicle; a sliding door including two door portions that open and close the entrance by sliding in a direction opposite to each other in a front-rear direction of the vehicle; and a step including a step body that is depressed by a passenger when the passenger gets on and gets off the vehicle, the step being able to be switched between a use state and a closed state by pivoting a vehicle lower portion on the entrance side as a pivot axis. In the use state of the step, the step body is in a posture in which the step body is deployed outward of the vehicle, and in the closed state of the step, the step body is in a posture in which the step body is closed on a vehicle side surface and faces the sliding door.

According to this configuration, in the closed state of the step, since the step body and the sliding door overlap each other as viewed from the vehicle side surface, the rigidity of the side portion of the vehicle can be increased. Therefore, it is possible to reduce the amount of entry of the sliding door into the vehicle, when the side collision of the vehicle with the other vehicle occurs.

In the boarding and alighting step-mounted vehicle according to the present disclosure, in the closed state of the step, the step body may extend from a body side surface that is located forward of the sliding door in the front-rear direction of the vehicle to a body side surface that is located rearward of the sliding door in the front-rear direction of the vehicle.

According to this configuration, an input from the side collision vehicle is received by the step body in the closed state and is transmitted to the body side surfaces on both sides of the sliding door, whereby the amount of entry of the sliding door into the vehicle can be reduced.

The boarding and alighting step-mounted vehicle according to the present disclosure may further include a seal member attached to a vehicle outer wall. The seal member may be continuous around a lower portion of the entrance. In the closed state of the step, the seal member may be located between the step and the vehicle outer wall to seal around the lower portion of the entrance.

According to this configuration, when the vehicle is located on a flooded road or the like, it is possible to suppress water from entering the vehicle cabin from the gap (the gap between the door portion and an edge of the entrance, the gap between the two door portions, etc.) of the lower portion of the sliding door.

In the boarding and alighting step-mounted vehicle according to the present disclosure, a seal member that contacts a vehicle outer wall in the closed state may be attached to the step, the seal member may be attached to the step so as to be continuous around a lower portion of the entrance in the closed state of the step, and in the closed state of the step, the seal member may be located between the step and the vehicle outer wall to seal around the lower portion of the entrance.

Also in this configuration, when the vehicle is located on a flooded road or the like, it is possible to suppress water from entering the vehicle cabin from the gap in the lower portion of the sliding door.

The boarding and alighting step-mounted vehicle according to the present disclosure may further include: a rod connected to a base portion of the step at a position offset from the pivot axis of the step, the base portion being continuous with the step body; and a motor that moves the rod in a vehicle width direction at a lower portion of a vehicle body. The step may include the base portion and may be made to have an L-shape with the base portion and the step body. The base portion of the step may be pivotably connected to a lower surface of the vehicle body on the entrance side so as to be pivotable about the pivot axis. By moving the rod in the vehicle width direction by the motor to cause the step to pivot about the pivot axis, the use state and the closed state of the step may be switched.

According to this configuration, it is possible to switch between the use state and the closed state of the step with a relatively simple structure.

In the boarding and alighting step-mounted vehicle according to the present disclosure, the step may include a base portion that is continuous with the step body, and the step may be made to have an L-shape with the base portion and the step body. The base portion of the step may be pivotably connected to a lower surface of the vehicle body on the entrance side so as to be pivotable about the pivot axis. The boarding and alighting step-mounted vehicle may further include a rod connected to an end portion of the step body, the end portion extending in a vehicle front-rear direction on a side away from a vehicle body in the used state. The rod may extend from the end portion of the step body toward a vehicle body side surface on an upper side of the entrance, and may enter a vehicle body upper portion through a hole provided in the vehicle body side surface. The boarding and alighting step-mounted vehicle may further include a motor that moves the rod in a vehicle vertical direction and a vehicle width direction at the vehicle body upper portion. By moving the rod in the vehicle vertical direction and the vehicle width direction by the motor to cause the step to pivot about the pivot axis, the use state and the closed state of the step may be switched.

According to this configuration, the rod functions as a member for switching the state of the step, and can also function as an auxiliary tool for supporting the body when the passenger gets on and gets off the vehicle.

In the boarding and alighting step-mounted vehicle according to the present disclosure, a rod-shaped handrail may be connected to the rod. The base of the handrail may be pivotably connected to the rod. The boarding and alighting step-mounted vehicle may further include a locking mechanism that locks the handrail at a parallel position parallel to the rod and a horizontal position that is horizontal to the rod.

According to this configuration, since the passenger uses the handrail in the horizontal position, the body of the passenger can be supported by the handrail, and thus the passenger can easily get on and get off the vehicle.

In the boarding and alighting step-mounted vehicle according to the present disclosure, the step body may include a rib extending in the vehicle front-rear direction on a surface located on the vehicle lower side in the use state and located outside the vehicle in the closed state.

According to this configuration, the bending of the step can be suppressed in the use state of the step, and the rib adjusts the vehicle traveling wind in the closed state of the step, so that it is possible to expect an improvement in the fuel efficiency of the vehicle.

According to the present disclosure, in the vehicle having the sliding door on the side portion, it is possible to reduce the amount of entry of the sliding door into the vehicle when a side collision with the other vehicle occurs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
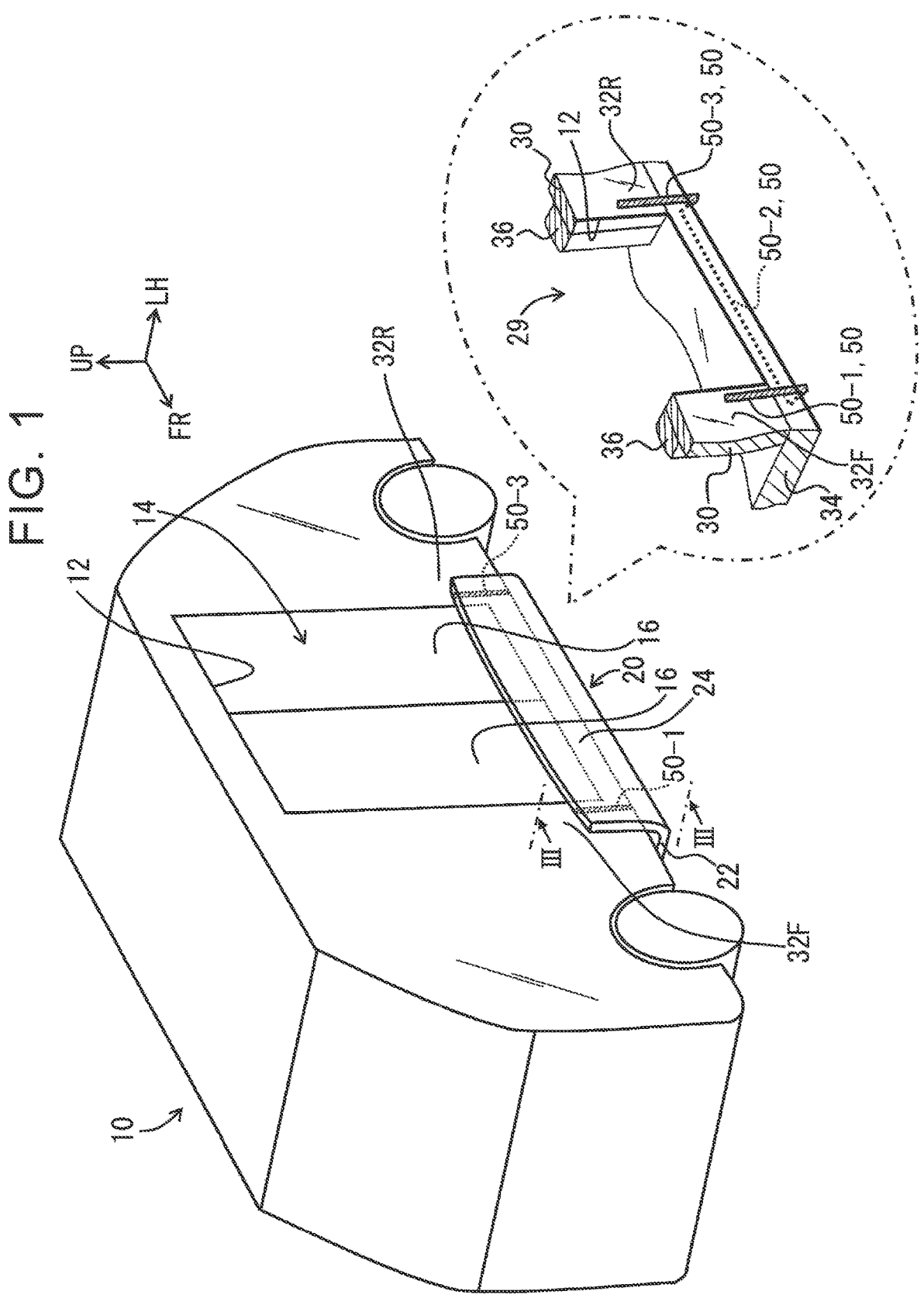
FIG. 1 is a perspective view showing a step-closed state of a vehicle 10 according to a first embodiment, and shows a body 29 near a lower portion of the entrance 12 in a lower right portion (an inner portion of a dashed line)

Hereinafter, embodiments of the present disclosure will be described with reference to the drawings. The present disclosure is not limited to the embodiment described below. In all the drawings, the same elements are denoted by the same reference numerals, and redundant descriptions thereof are omitted. In the following description, unless otherwise specified, the terms indicating the front-rear, right-left, and up-down, etc. directions indicate the directions related to a vehicle. In each figure, the direction of the arrow FR indicates a forward direction, the direction of the arrow UP indicates an upward direction, and the direction of the arrow LH indicates a leftward direction. The vehicle width direction is the same as the left-right direction of the vehicle.

Figure 2:
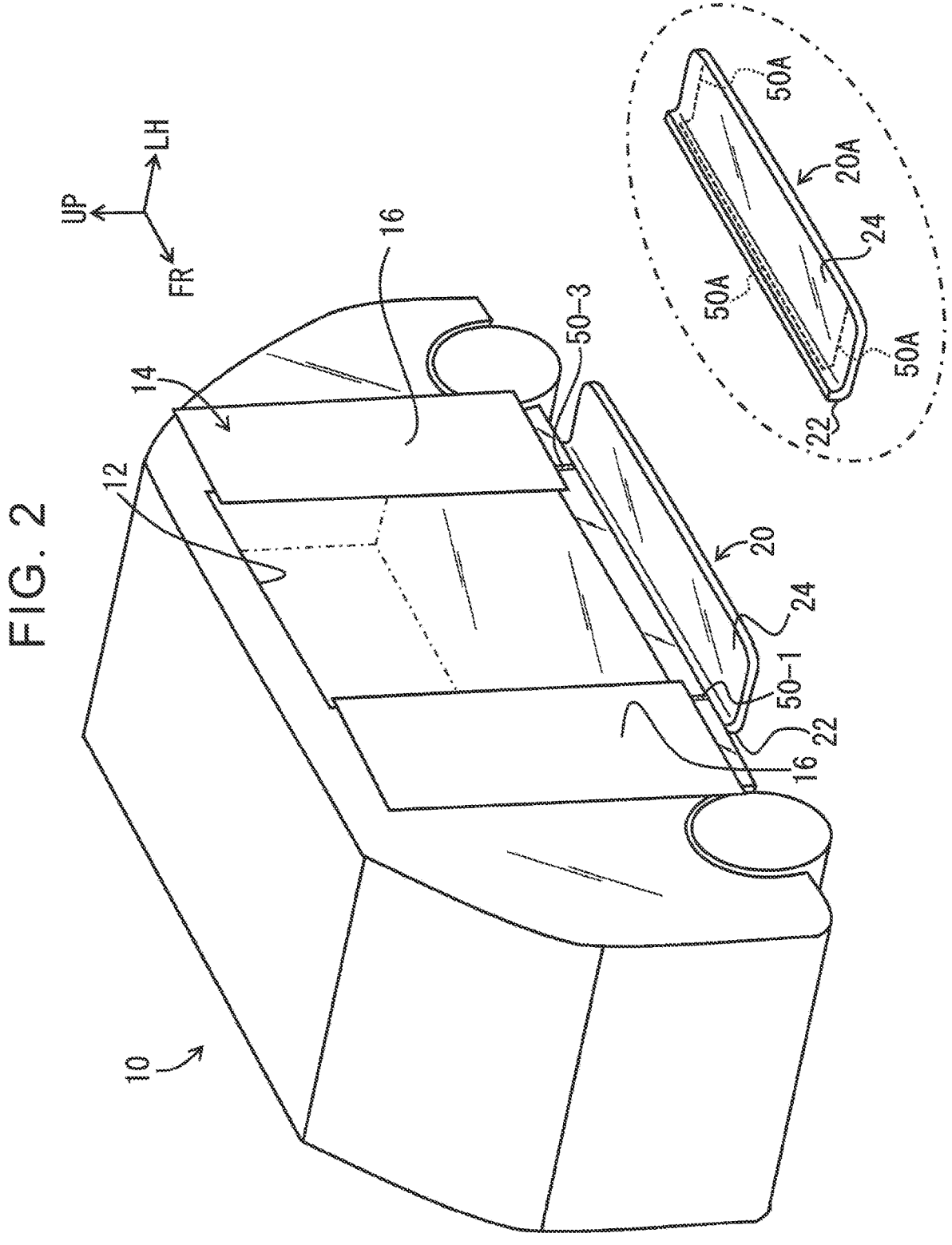
FIG. 2 is a perspective view showing a step use condition of the vehicle 10 according to the first embodiment, and shows an explanatory view of a step 20A of another embodiment in a lower right portion (an inner portion of a dashed-dotted line)

FIG. 1 and FIG. 2 are perspective views illustrating a vehicle 10 according to the first embodiment. FIG. 1 shows a closed state of the sliding door 14 and a closed state of step 20. FIG. 2 shows the open state of the sliding door 14 and the use state (deployed state) of step 20. The lower right portion of FIG. 1 (the inner portion of the one-dot chain line) shows the body 29 near the lower portion of the entrance 12. The lower right part of FIG. 2 (the inner part of the dashed-dotted line) is an explanatory diagram of 20A of steps of another embodiment.

The vehicle 10 is an autonomous vehicle. Specifically, the vehicle 10 can operate in a plurality of driving modes including an automatic driving mode and a manual driving mode. The vehicle 10 is a battery electric vehicle using a rotary electric machine (not shown) as a drive source. In the vehicle 10, a battery for supplying electric power to the rotary electric machine is mounted on the lower side of the vehicle interior floor. As another embodiment, the vehicle 10 may be an automobile using an internal combustion engine as a drive source.

The vehicle 10 is used as a bus on which an unspecified number of occupants ride. An entrance 12 is provided on the vehicle body side portion of the vehicle 10. The entrance 12 is located substantially in the center in the vehicle front-rear direction, and is closed by the sliding door 14 as shown in FIG. 1 when the vehicle is traveling. The sliding door 14 has two door portions 16. The two door portions 16 open and close the entrance 12 by sliding in directions opposite to each other in the front-rear direction. As shown in FIG. 2, the front side door portion 16 moves forward and the rear side door portion 16 moves backward, whereby the entrance 12 is opened. Further, the front side door portion 16 moves backward and the rear side door portion 16 moves forward, whereby the entrance 12 is closed.

The vehicle 10 includes a step 20 for getting on and off. Step 20 includes a base portion 22 and a step body 24 that the occupant steps on and off the vehicle. As shown in the upper view of FIG. 3 (III-III cross-sectional view of FIG. 1), the base portion 22 is the part located underneath the rocker 34 in the closed condition of step 20. The base portion 22 is continuous with the step body 24. Step 20 is formed in an L-shape by the base portion 22 and the step body 24. The base portion 22 is provided with a pivot axis 25.

Step 20 is switchable between a use state (lower view of FIG. 3) and a closed state (upper view of FIG. 3) by rotating about a pivot axis 25 provided in the vehicle lower portion on the entrance side. As shown in FIG. 2, in the use state of step 20, the step body 24 is in a posture deployed outward of the vehicle. Further, as shown in FIG. 1, in the closed state of step 20, the step body 24 is closed on the vehicle side and is in a posture facing the sliding door 14. When the vehicle is traveling, as shown in FIG. 1, the step 20 is in a closed state. When the occupant gets on and off, step 20 is in the use state as shown in FIG. 2.

In the vehicle 10, the step 20 is switched from the closed state to the use state before the sliding door 14 is opened. Further, after the sliding door 14 is closed, the step 20 is switched from the use state to the closed state. Note that the operation of the sliding door 14 and the operation of step 20 may be performed at the same time.

Here, the body in the vicinity of the lower portion of the entrance 12 will be described. As shown in the lower right portion of FIG. 1 (the inner portion of the dashed-dotted line), the body 29 of the vehicle includes a body side 30, a pillar 36, and a rocker 34. The pillars 36 are disposed on the front side and the rear side of the entrance 12, respectively. The rocker 34 is disposed below the entrance 12. In the lower right portion of FIG. 1, the rocker 34 is illustrated as being integrated with the floor member, but may actually be configured separately from the floor member. The two pillars 36 constitute a body skeleton.

The vehicle 10 includes a seal member 50 attached to a vehicle outer wall (a body side surface 32F, 32R and a lower surface of the rocker 34). The seal member 50 is made of, for example, rubber or resin, and is a flexible belt-like member. The seal member 50 is provided continuously around the lower portion of the entrance 12. In the drawings, reference numerals 50-1, 50-2, and 50-3 respectively denote a seal member 50 provided on the front body side surface 32F, a seal member 50 provided on the lower surface of the rocker 34, and a seal member 50 provided on the rear body side surface 32R.

In the closed state of step 20, the seal member 50 is positioned between the step 20 and the vehicle outer wall to seal the lower portion of the entrance 12. Therefore, when the vehicle 10 is located on a flooded road or the like, it is possible to suppress the water 100 (see FIG. 3) from entering the vehicle cabin from a gap at the lower part of the sliding door (a gap between the door portion 16 and the edge of the entrance 12 or a gap between the two door portions 16). In addition, the presence of the seal member 50 can prevent the generation of sound or the like caused by the contact between the body and the step 20.

Instead of attaching the seal member 50 to the outer wall of the vehicle as described above, the seal member 50A may be attached to 20A of steps as shown in the lower right portion of FIG. 2 (the inner portion of the dashed line). In this configuration, the step 20A is provided with a seal member 50A that comes into contact with the outer wall of the vehicle when the step 20A is closed. The seal member 50A is attached to the step 20A so as to be continuous around the lower portion of the entrance 12 when the step 20A is closed. When the step 20A is closed, the seal member 50A is positioned between the step 20A and the vehicle outer wall, so that the lower portion of the entrance 12 is sealed. Even in this configuration, it is possible to suppress water from entering the vehicle cabin. In addition, it is possible to prevent generation of noise caused by direct contact between the body and the stepped 20A.

In the vehicle 10, the seal member 50 and 50A are not essential members, and the seal member 50 and 50A may be omitted. In addition, in the vehicle 10, only the seal members 50-1 and 50-3 on the side surface 32F, 32R of the body may be provided without the seal member 50-2 on the lower side of the entrance 12.

As shown in FIG. 1, in the closed state of step 20, in the vehicle side view, the step body 24 overlaps the lower portion of the sliding door 14. Therefore, the rigidity of the lower portion of the vehicle side is increased, and it is possible to reduce the amount of intrusion of the sliding door 14 into the vehicle when the other vehicle collides with the vehicle 10.

Further, in the closed state of step 20, the step body 24 extends from the body side surface 32F located on the vehicle front side of the sliding door 14 to the body side surface 32R located on the vehicle rear side of the sliding door 14. Therefore, by receiving the input load from the side collision vehicle in the step body 24 in the closed state and transmitting the input load to the body side surface 32F, 32R on both sides of the sliding door 14, it is possible to reduce the intrusion of the sliding door 14 into the vehicle interior. In addition, since the step 20 and the rocker 34 overlap each other and the rigidity of the vehicle side lower portion is also increased in a plan view of the vehicle, it is possible to suppress the side collision vehicle from entering the inside of the vehicle. The input load at the time of side collision is distributed to the pillar 36 and the rocker 34 via the step 20.

Further, according to this embodiment, since the reinforcement of the sliding door 14 with respect to the side projection can be omitted or reduced, it is possible to suppress an increase in the mass of the sliding door 14 due to the reinforcement and an increase in the cost.

Figure 4:
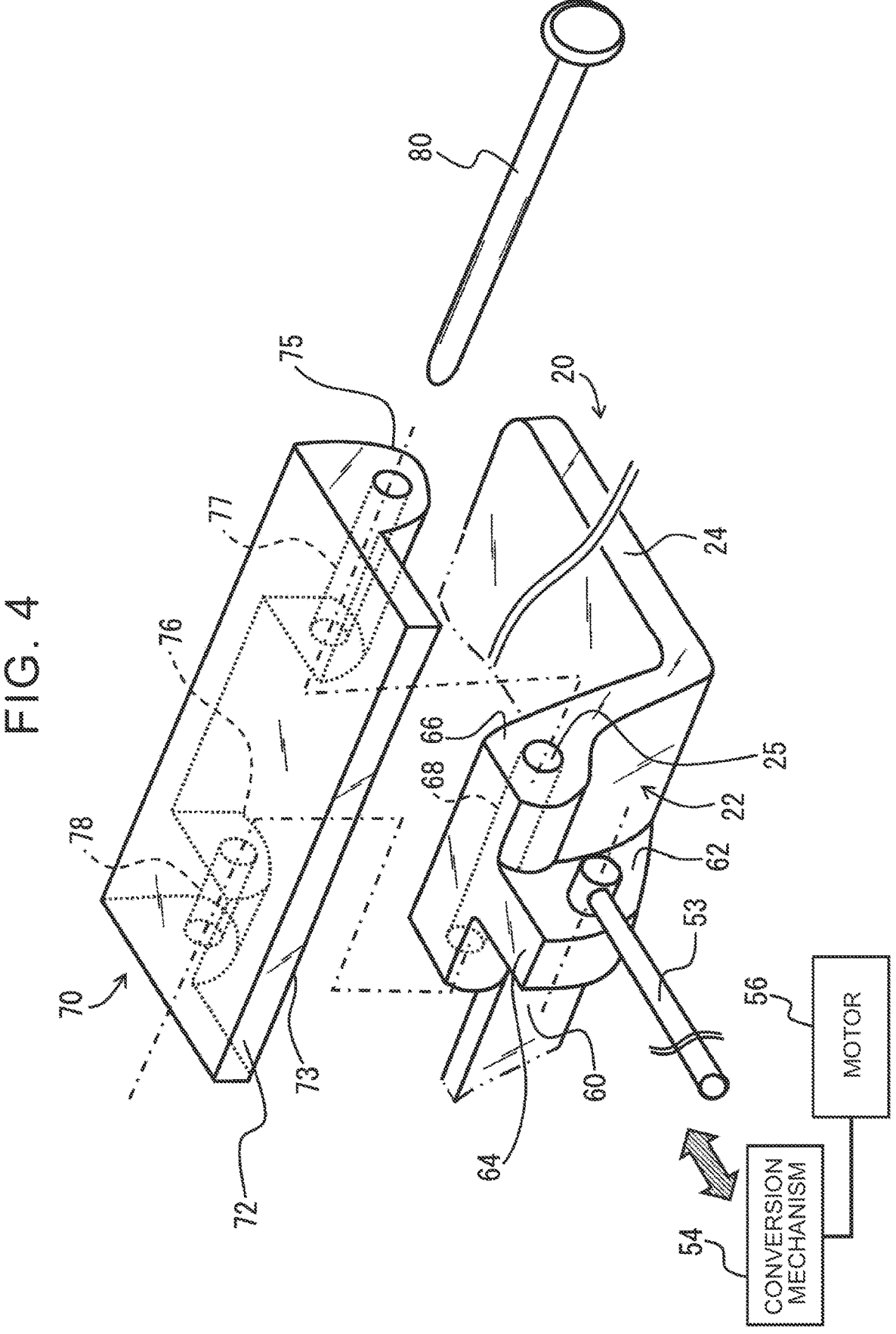
FIG. 4 is a perspective view for explaining the mounting structure of step 20.

Next, the mounting structure of step 20 will be described. As shown in FIG. 4, the vehicle 10 includes a fixing member 70 coupled to a body (rocker). The fixing member 70 includes a plate-shaped base body 72 and two raised portions 75 and 76 raised downward from the base body 72. The raised portions 75 and 76 are located outside the vehicle of the base body 72 and are spaced apart from each other in the front-rear direction. The connecting portion 66 of the step 20 is arranged between the raised portions 75 and 76. Each of the raised portions 75 and 76 is provided with through holes 77 and 78 through which the pin 80 passes.

The base portion 22 of step 20 comprises a base body 60, a connecting portion 66, and a rib 62. The base body 60 is a portion that rises upward from the step body 24 and extends in the front-rear direction. The connecting portion 66 is provided on the upper side of the base body 60. In this embodiment, the connecting portion 66 is provided at both ends (two positions) of the step 20 extending in the front-rear direction (in FIG. 4, a connecting portion 66 at one end of the step 20 is shown, and a connecting portion 66 at the other end of the step 20 is not shown). The connecting portion 66 may be further provided near the center of the step 20 extending in the front-rear direction. The position and the number of the connecting portions 66 in the front-rear direction can be changed as appropriate. A rib 62 and a rod 53 are provided and a fixing member 70 is provided in accordance with the position of the connecting portion 66. The connecting portion 66 is provided with a through hole 68 through which the pin 80 passes.

The connecting portion 66 of step 20 is arranged between the two raised portions 75, 76 of the fixing member 70. The pin 80 is passed through the through-hole 77 of the fixing member 70, the through-hole 68 of the step 20, and the through-hole 78 of the fixing member 70. Thus, the step 20 is rotatable with respect to the fixing member 70 using the pin 80 as the pivot axis 25. In this way, a hinge-type structure is provided.

The rib 62 of the step 20 is provided in accordance with the position of the connecting portion 66, and protrudes from the connecting portion 66 and the base body 60 inward of the vehicle. An end portion of the rod 53 is pivotably connected to the rib 62. The rod 53 is connected to the rib 62 at a position offset from the pivot axis 25 of the step 20. The upper surface of the rib 62 is a stopper surface 64. As shown in the lower view of FIG. 3, the stopper surface 64 of the rib 62 abuts against the lower surface 73 of the base body of the fixing member 70 in the step use state. This prevents further rotation of the step 20 in the step use state.

Figure 3:
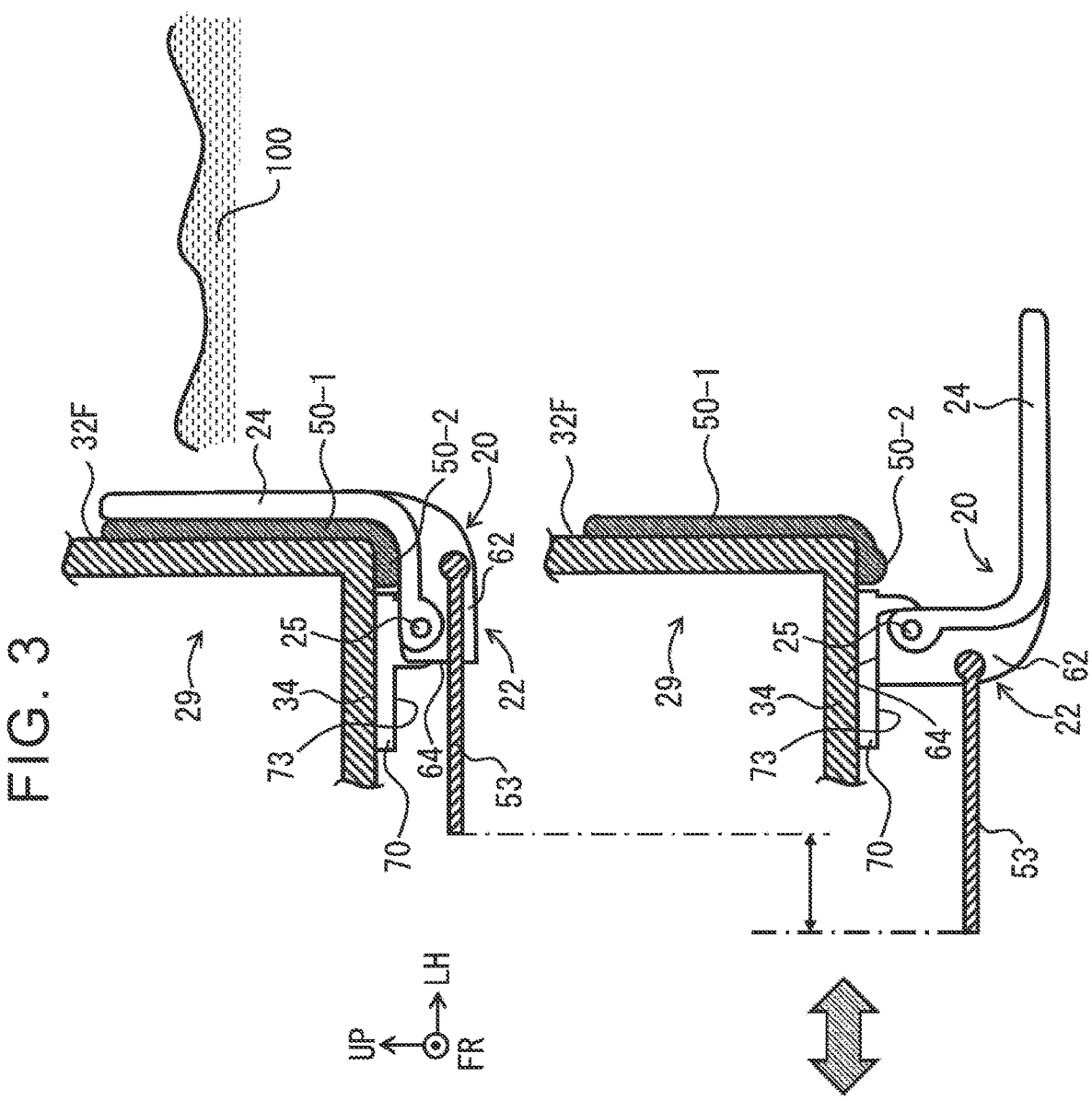
FIG. 3 is a cross-sectional view taken along III-III line of FIG. 1, showing a step closed state on the upper side and a step used state on the lower side.

The vehicle 10 includes a motor 56 that moves the rod 53 in the vehicle width direction at the lower portion of the vehicle body. By moving the rod 53 in the vehicle width direction by the motor 56, as shown in FIG. 3, the step 20 is rotated about the pivot axis 25. Accordingly, the use state and the closed state of step 20 are switched. That is, when the motor 56 pushes the rod 53 outward of the vehicle, the step 20 changes from the use state to the closed state, and when the motor 56 pulls the rod 53 inward of the vehicle, the step 20 changes from the closed state to the use state.

The vehicle 10 may include a conversion mechanism 54 that converts the rotational motion of the motor 56 into a linear motion for moving the rod 53. As the conversion mechanism 54, for example, a slider crank mechanism, a rack and pinion mechanism, an eccentric cam mechanism, or the like can be employed. As the motor 56, a linear motor or the like that generates linear motion may be employed.

Figure 5:
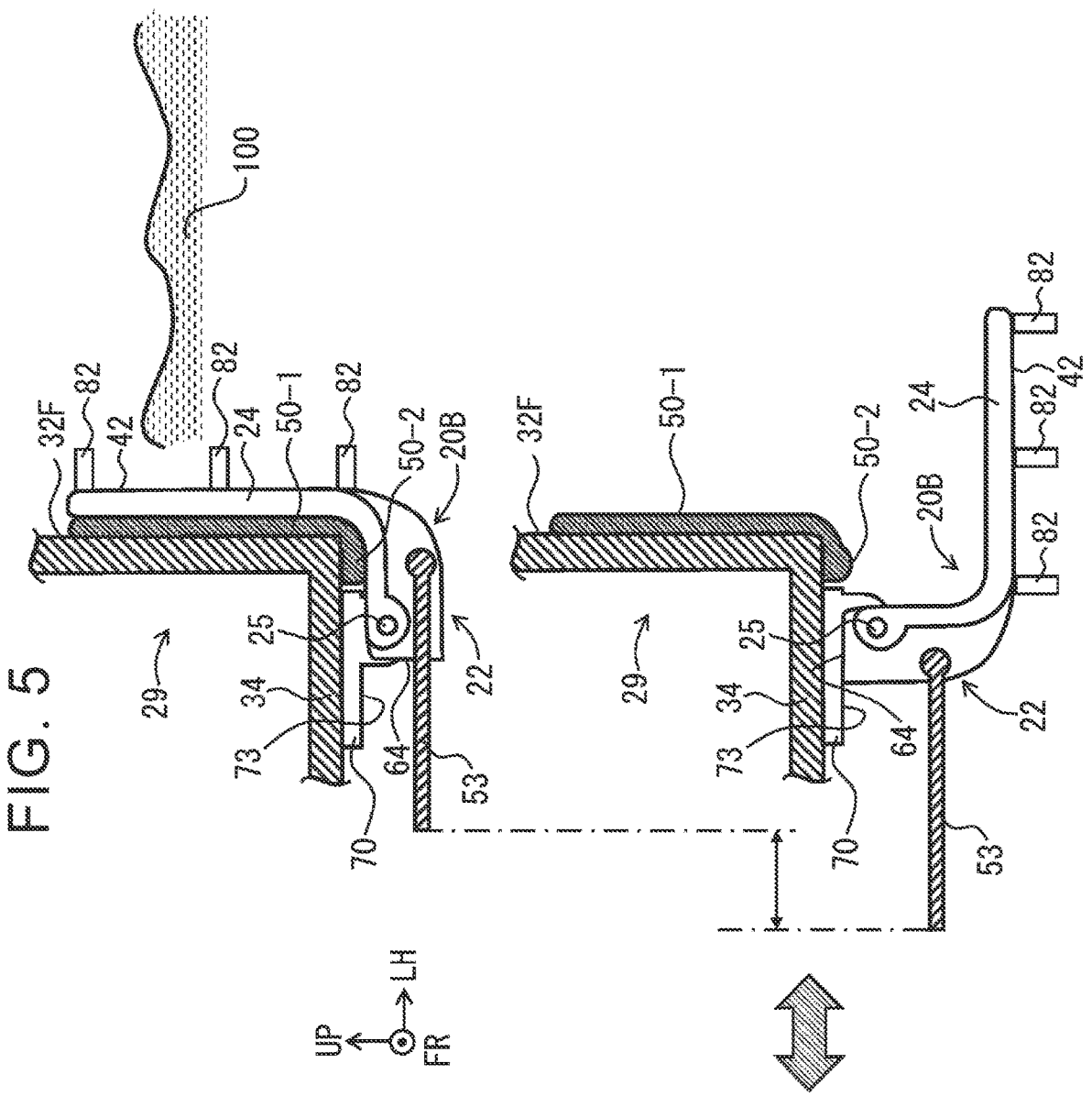
FIG. 5 is a view showing a step 20B provided with ribs 82, showing a step closed state on the upper side and a step used state on the lower side.

Next, the steps of another embodiment will be described. In FIG. 5, a 20B of steps of another embodiment is shown. In this embodiment, the step body 24 has a rib 82 extending in the front-rear direction on a rear surface 42 (a surface 42 positioned outward of the vehicle in the closed state, and a surface 42 positioned on the vehicle lower side in the use state). The rib 82 extends over the entire front-rear direction of the step body 24. FIG. 5 illustrates a configuration in which three ribs 82 are provided on the rear surface 42 of the step body 24. However, the number of the ribs 82 may be one or four or more.

According to the step 20B of this alternative embodiment, in the use condition of the step 20B (lower view of FIG. 5), the step body 24 can be restrained from being deflected by the ribs 82. That is, the deflection of the step body 24 can be suppressed when the occupant rides on the step body 24. In addition, since the ribs 82 rectify the vehicle traveling wind in the closed state 20B steps (upper side view of FIG. 5), it is possible to expect improvement in fuel efficiency of the vehicle.

Figure 6:
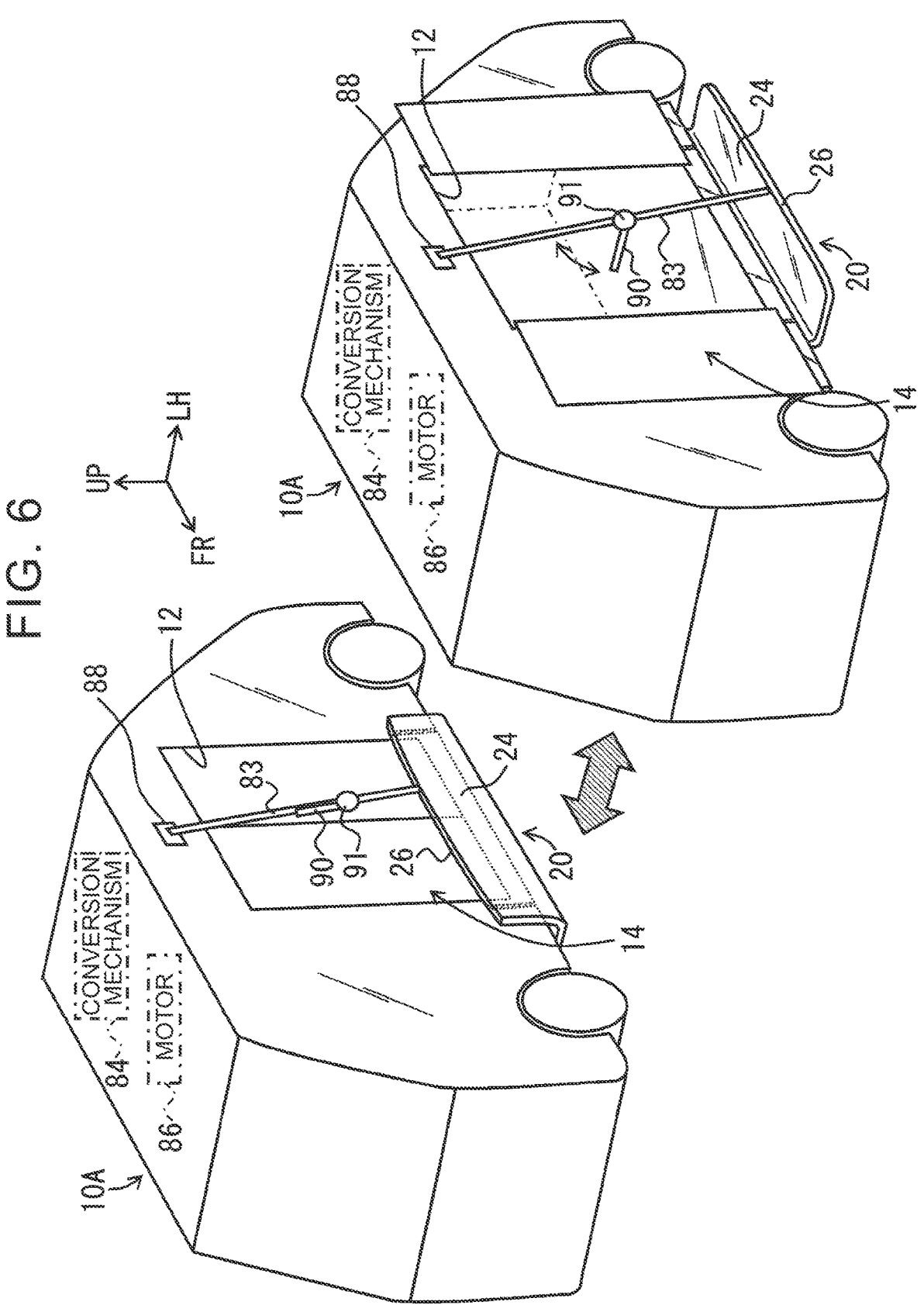
FIG. 6 is a perspective view showing the vehicle 10A according to the second embodiment, showing a step closed state on the upper left side and a step used state on the lower right side.

Next, the vehicle of the second embodiment will be described. FIG. 6 is a perspective view showing the vehicle 10A according to the second embodiment, showing a step closed state on the upper left side and a step used state on the lower right side. The difference between the vehicle 10 of the first embodiment and the vehicle 10A of the second embodiment is the configuration of a rod for switching between the closed state and the use state of step 20.

The vehicle 10A of the second embodiment includes the rod 83 for pulling up the steps 20 on the vehicle side. The rod 83 is connected to an end portion 26 of the step body 24 that extends in the front-rear direction on the side away from the vehicle body in the step use state. The rod 83 extends from the end portion 26 of the step body 24 toward the vehicle body side surface on the upper side of the entrance 12, and enters the vehicle body upper portion through a hole 88 provided in the vehicle body side surface.

The vehicle 10A includes a motor 86 that moves the rod 83 in the up-down direction and the vehicle-width direction at the upper portion of the vehicle body. The motor 86 is disposed inside the body on the upper side of the sliding door 14. By moving the rod 83 in the vertical direction and the vehicle width direction by the motor 86, the step 20 is rotated about the pivot axis 25 (see FIG. 3, however, the rod 53 in FIG. 3 does not exist), so that the use state and the closed state of the step 20 are switched. That is, when the motor 86 pulls up the rod 83, the step 20 is changed from the use state to the closed state. Further, the motor 86 pushes out the rod 83, so that the step 20 is changed from the closed state to the use state. The vehicle 10A may include a converting unit 84 that converts the rotational motion of the motor 86 into a motion for moving the rod 83 in the up-down direction and the vehicle-width direction.

According to the second embodiment, the rod 83 function as a member for switching the status of the steps 20, and can also function as aids for supporting the body when the occupant gets on and off the vehicle 10A.

Further, as shown in FIG. 6, in the vehicle 10A, a rod-shaped handrail 90 may be connected to the rod 83. The root of the handrail 90 is pivotally connected to the rod 83. The base of the handrail 90 is connected to, for example, the vicinity of the center of the rod 83 in the up-down direction. The vehicle 10A includes a locking device 91 that locks the handrail 90 at a parallel position parallel to the rod 83 and a horizontal position. According to this configuration, since the occupant uses the handrail 90 (refer to the lower right view in FIG. 6) in the horizontal position, the body of the occupant is supported by the handrail, and thus the occupant can easily get on and off the vehicle 10A. Further, by setting the handrail 90 at a position (parallel position) parallel to the rod 83, the handrail 90 does not interfere with the sliding door 14.

In the vehicle, both the rod 53 of the first embodiment (see FIG. 3) and the rod 83 of the second embodiment (see FIG. 6) may be provided. In this case, when the step 20 is switched from the closed state to the use state, the rod 53 (FIG. 3) is pulled inward of the vehicle, and the step 20 is moved. On the other hand, when the step 20 is switched from the use state to the closed state, the rod 83 (FIG. 6) is pulled up and the step 20 is moved. In this way, only the force in the pulling direction is applied to the rods 53 and 83. Therefore, the strength of the rods 53 and 83 can be reduced, and the weight of the rods 53 and 83 can be reduced.

Variations will now be described. In the embodiment described above, in the vehicle, the step 20 is disposed outside the vehicle of the sliding door 14. However, in the vehicle, the step 20 may be disposed inside the vehicle of the sliding door 14 and outside the vehicle from the body side surface or the rocker. In this case, after the sliding door 14 is opened, the step 20 is switched from the closed state to the use state. Further, before the sliding door 14 is closed, the step 20 is switched from the use state to the closed state.

In the embodiment described above, the sliding door 14 has two door portions 16. However, the sliding door 14 may have one door portion. In this case, one door portion (for example, a relatively large door portion) is moved to one side in the vehicle front-rear direction to open the entrance, and the door portion is moved to the other side in the vehicle front-rear direction to close the entrance.

In the above-described embodiment, the door for opening and closing the entrance 12 is a sliding door. Such a sliding door is movable along a slide rail provided on the body, for example. However, the door for opening and closing the entrance may be a hinge type door (for example, a side door used in a general passenger car). The hinge-type door pivots about a hinge portion provided on the body to open and close the entrance.

What is claimed is:

1. A boarding and alighting step-mounted vehicle comprising:

an entrance provided on a side portion of a vehicle;

a sliding door including two door portions that open and close the entrance by sliding in a direction opposite to each other in a front-rear direction of the vehicle; and a step including a step body that is depressed by a passenger when the passenger gets on and gets off the vehicle, the step being able to be switched between a use state and a closed state by pivoting a vehicle lower portion on a side of the entrance as a pivot axis, wherein:

in the use state of the step, the step body is in a posture in which the step body is deployed outward of the vehicle;

in the closed state of the step, the step body is in a posture in which the step body is closed on a vehicle side surface and faces the sliding door;

in the closed state of the step, the step body extends from a body side surface that is located forward of the sliding door in the front-rear direction of the vehicle to a body side surface that is located rearward of the sliding door in the front-rear direction of the vehicle;

the boarding and alighting step-mounted vehicle further comprises a seal member attached to a vehicle outer wall, the seal member being continuous around a lower portion of the entrance; and in the closed state of the step, the seal member is located between the step and the vehicle outer wall to seal around the lower portion of the entrance.

2. A boarding and alighting step-mounted vehicle comprising:

an entrance provided on a side portion of a vehicle;

a sliding door including two door portions that open and close the entrance by sliding in a direction opposite to each other in a front-rear direction of the vehicle; and a step including a step body that is depressed by a passenger when the passenger gets on and gets off the vehicle, the step being able to be switched between a use state and a closed state by pivoting a vehicle lower portion on a side of the entrance as a pivot axis, wherein:

in the use state of the step, the step body is in a posture in which the step body is deployed outward of the vehicle;

in the closed state of the step, the step body is in a posture in which the step body is closed on a vehicle side surface and faces the sliding door;

in the closed state of the step, the step body extends from a body side surface that is located forward of the sliding door in the front-rear direction of the vehicle to a body side surface that is located rearward of the sliding door in the front-rear direction of the vehicle;

a seal member that contacts a vehicle outer wall in the closed state is attached to the step;

the seal member is attached to the step so as to be continuous around a lower portion of the entrance in the closed state of the step; and in the closed state of the step, the seal member is located between the step and the vehicle outer wall to seal around the lower portion of the entrance.

* * * * *